United States Patent
Karasawa

(10) Patent No.: US 7,110,615 B2
(45) Date of Patent: Sep. 19, 2006

(54) IMAGE PROCESSING METHOD, PROGRAM OF THE SAME, AND IMAGE PROCESSING APPARATUS FOR SEARCHING IMAGES AND PRODUCING REALISTIC IMAGES

(76) Inventor: Hideyasu Karasawa, c/o Data Cake Baker Corporation, 3-37, Akasaka 7-chome, Minato-ku, Tokyo (JP) 107-0052

( * ) Notice: Subject to any disclaimer, the term of this patent is extended or adjusted under 35 U.S.C. 154(b) by 689 days.

(21) Appl. No.: 10/086,630

(22) Filed: Mar. 4, 2002

(65) Prior Publication Data

US 2003/0165257 A1 Sep. 4, 2003

(51) Int. Cl.
*G06K 9/18* (2006.01)

(52) U.S. Cl. ............. 382/284; 382/111; 345/619; 345/629; 345/630; 345/632; 345/633; 345/634

(58) Field of Classification Search ......... 382/111, 382/284; 345/619–641; 112/475.19
See application file for complete search history.

(56) References Cited

U.S. PATENT DOCUMENTS

| 5,815,645 A * | 9/1998 | Fredlund et al. ........... 358/1.18 |
| 5,930,769 A * | 7/1999 | Rose ........................... 705/27 |
| 5,960,726 A * | 10/1999 | Yamada .................. 112/102.5 |
| 6,628,298 B1 * | 9/2003 | Debevec .................... 345/632 |
| 6,661,906 B1 * | 12/2003 | Kawade et al. ............. 382/118 |

* cited by examiner

*Primary Examiner*—Sanjiv Shah
*Assistant Examiner*—Craig Kronenthal
(74) *Attorney, Agent, or Firm*—Arent Fox, PLLC.

(57) ABSTRACT

An image processing method by which image information of a variety of artifacts can be easily searched through in accordance with attributes of the artifacts and the image information combined to easily produce a realistic image close to reality, comprising the steps of generating an artifact information object of clothing or another artifact by using element information object data indicating attributes of an element forming a component of the artifact and artifact generating processing object data indicating a processing procedure for generating the artifact by using the same, then combining the artifact and base artifact information object data of a base artifact such as a doll to generate image data of a scene of for example a doll with clothes on.

17 Claims, 6 Drawing Sheets

IMAGE PROCESSING METHOD, PROGRAM OF THE SAME, AND IMAGE PROCESSING APPARATUS FOR SEARCHING IMAGES AND PRODUCING REALISTIC IMAGES

BACKGROUND OF THE INVENTION

1. Field of the Invention

The present invention relates to an image processing method, a program of the same, and an image processing apparatus capable of searching through attributes of a variety of kinds of elements, storing the elements in a combinable format, and efficiently generating an image by using the same.

2. Description of the Related Art

In recent years, due to the spread of computer graphics, a variety of image data has been produced by computer. Processing of a variety of multimedia data has become possible due to the spread of high performance computers and multimedia programs.

In the past, images of consumer and cultural items and works of art has been stored in memories as bit images. When using computer graphics to prepare for example an image of a doll wearing clothes, the usual practice is to compose it by performing simple processing such as producing an image of the doll and an image of the clothes as a single image or simply superimposing an image of clothes and an image of a human being prepared in a library in advance.

In the above computer graphics of the related art, however, the doll's shape and other attributes are not reflected in the image of the clothes, so there is the disadvantage that a realistic image cannot be obtained.

Further, the appearances of the clothes, doll, etc. actually change in accordance with their material or production process, however, there is a disadvantage that with the computer graphics of the related art, it is difficult to obtain images reflecting these.

Further, with the above computer graphics, for example, while images of clothes and images of dolls have been separately stored, information indicating the process of combining the two has not been stored and the two connected. Thus, there is a disadvantage that factors having cultural characteristics such as the materials of the stored consumer items or the shape, color, texture, etc. forming the visual expression cannot be efficiently searched through or edited.

Further, in the related art, only image data of a fixed bit images is stored in the memory: the image data is not linked with each other or organized. Therefore, there is a disadvantage that it is difficult to extract elements of cultural characteristics as cultural factors and freely search through image data stored in a memory, assemble and reproduce it, or combine it with new factors to create and otherwise process images of new consumer items.

SUMMARY OF THE INVENTION

An object of the present invention is to provide an image processing method, a program thereof, and an image processing apparatus enabling easy and efficient searches through image information of a variety of objects in accordance with the attributes of those objects and enabling easy production of a realistic image close to reality by combining the same.

To attain the above object, according to a first aspect of the present invention, there is provided an image processing method for image processing by using information indicating characteristics of all or part of a consumer item and a routine thereof, comprising the steps of generating material module data indicating an attribute of a material; generating element generating processing module data indicating an attribute of processing for generating an element serving as a component of a first artifact, that is, said consumer item, by using said material; generating element module data indicating an attribute of said element using said material module data and said element generating processing module data; generating first artifact module data indicating an attribute of said first artifact using said element module data; generating second artifact module data indicating an attribute of a second artifact to be linked with said first artifact; storing said first artifact module data and said second artifact module data in a searchable form; and generating image data of a scene connecting said first artifact and said second artifact by using said stored first artifact module data and said second artifact module data.

According to a second aspect of the present invention, there is provided an image processing method comprising the steps of generating element module data indicating an attribute of an element serving as a component of a first artifact, that is, said consumer item; generating first artifact module data indicating an attribute of said first artifact by using said element module data; generating second artifact module data indicating an attribute of a second artifact to be linked with said first artifact; and generating image data of a scene linking said first artifact and said second artifact by using said first artifact module data and said second artifact module data.

Alternatively, preferably, the image processing method image data further includes the steps of inputting image data of a target element, analyzing the input image data, and generating said element module data by using said material module data and said element generating processing module data selected based on results of the analysis.

Alternatively, preferably, the image processing method further includes the steps of generating material shape module data obtained by gathering information relating to a shape of said material, material color module data obtained by gathering information regarding a color of said material, material texture module data obtained by gathering information regarding a texture of said material, and material combination module data obtained by gathering information indicating a combined pattern of the shape, color, and design of said material and of generating said element module data by combining information gathered with at least one of said material shape module data, said material color module data, and said material pattern module data based on a combined pattern indicated by said material combination module data.

As a result, it is possible to separately store information of a shape, color, and design of a material and a combined pattern thereof and to generate element module data for providing an image of elements obtained by combining these in a specified combined pattern.

More preferably, the image processing method further includes the steps of inputting image data of a target element, analyzing the input image data, and generating said element module data by using said material combination module data, said material shape module data, said material color module data, and said material pattern module data selected based on results of the analysis.

Alternatively, preferably, the image processing method further includes the steps of generating first artifact generating processing module data indicating an attribute of processing performed by using said element so as to obtain said first artifact and of generating said first artifact module data by using said element module data and said first artifact generating processing module data.

More preferably, the image processing method further includes the steps of inputting image data of a target first artifact, analyzing the input image data, and generating said first artifact module data by using said element module data and said first artifact generating processing module data based on results of the analysis.

Alternatively, preferably, the image processing method further includes the steps of generating second artifact part module data indicating an attribute of a part of said second artifact; generating second artifact generating processing module data indicating an attribute of processing for obtaining said second artifact by combining a plurality of said parts; and generating said second artifact module data by using said second artifact part module data and said second artifact generating processing module data.

Preferably, said second artifact part module data includes information indicating a relationship with another second artifact part and said first artifact.

More preferably, the image processing method further includes the steps of inputting image data of a target scene, analyzing the input image data, and generating said image data by using said first artifact module data and said second artifact module data selected based on results of the analysis.

Alternatively, preferably, the image processing method further includes the step of generating at least one at least one of said element module data, said first artifact module data, said second artifact module data, and said scene based on information on an environment wherein said first artifact or said second artifact is used or an environment to which said scene is applied.

According to a third aspect of the present invention, there is provided a program that describes a procedure of the above image processing method and is executed by a computer.

According to a fourth aspect of the present invention, there is provided an image processing apparatus for performing image processing by using information indicating characteristics of all or part of a consumer item and its routine, which generates element module data indicating an attribute of an element serving as a component of a first artifact, that is, said consumer item; generating first artifact module data indicating an attribute of said first artifact by using said element module data; generating second artifact module data indicating an attribute of a second artifact to be linked with said first artifact; and generating image data of a scene wherein said first artifact and said second artifact are linked by using said first artifact module data and said second artifact module data.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Below, an image processing method according to an embodiment of the present invention will be explained.

Figure 1:
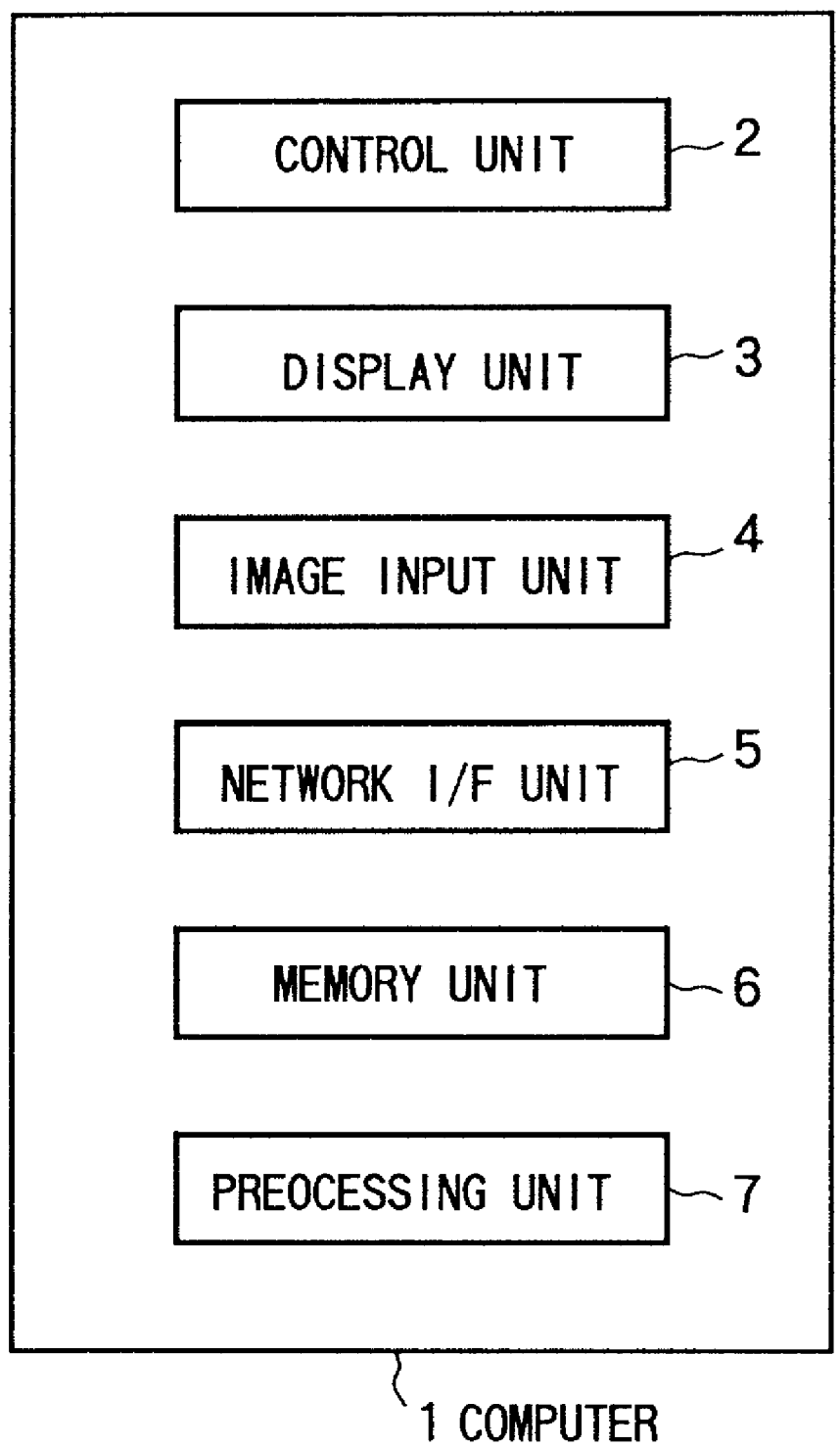
FIG. 1 is a view of the configuration of a computer used for performing the image processing method of an embodiment of the present invention.

FIG. 1 is a view of the configuration of a computer 1 used to perform the image processing method of the present embodiment.

The computer 1 corresponds to an image processing apparatus of the present invention.

As shown in FIG. 1, the computer 1 comprises an control unit 2, display unit 3, image input unit 4 network I/F unit 5, memory unit 6, and processing unit 7.

The control unit 2 is a keyboard, mouse, etc. which outputs a control signal in accordance with a user's operation to the processing unit 7.

The display unit 3 displays an image in accordance with a display signal from the processing unit 7.

The image input unit 4 receives as an input image data of, for example, an element, artifact (a first artifact of the present invention), base artifact (a second artifact of the present invention), picture of a scene (expression), etc., sketch, and other motifs.

The network I/F unit 5 is connected to the Internet or other network, receives for example image data from other computers, and sends image data of a scene generated by the processing unit 7 to other computers.

The processing unit 7 executes a program read from the memory unit 6 to perform later explained image processing.

First, the concepts of terms used in the present embodiment will be explained.

An "artifact" is an object to be linked with a base artifact in the finally generated single scene (frame image). As an artifact, there are for example a variety of consumer and cultural items such as fabrics, clothes, belts, bags, hair accessories, and other accessories, tiles, paper ware, lacquer ware, interior decor, and other furniture, household articles, etc. for the home, and furthermore ceramic, glass, and other tableware.

An "element" is something forming a component of the "artifact". As an element, for example, there are components of the above consumer and cultural articles, for example, a fabric when the "artifact" is fabric clothing.

A "material" is used, for example, when producing an element. For example, when the "element" is a fabric, the material is the warp and weft etc. set on a weaving machine.

A "base artifact" is an object to be linked with an artifact in the finally generated single scene (a frame image). As a base artifact, there are for example a doll, human being, desk, floor, etc.

A "base artifact part" is a part forming a component of a base artifact, for example, a head or hand of a human being, a leg of a desk, etc.

Note that the above "artifact" and "base artifact" relate to for example consumer items.

Also, the object data used in the present embodiment is multimedia data indicating attributes of an object by using for example at least one of an image, sound, and text. Also, the object data is for example hyper data having a hyperlink function for referring to another entity.

Below, the routine of image processing performed in the computer 1 by the processing unit 7 executing a program will be explained.

In the present embodiment, for example, image information of an "element" such as a fabric is generated from image information of a "material" such as thread, while image information of an "artifact" such as clothing is generated by using the "element" image information. Also, image information of a "base artifact" such as a doll is generated by combining image information of "base artifact parts" such as hands and legs of a doll. The explanation will be made of a case of generating image information of a scene projecting a doll wearing clothes by combining the "element" image information and "base artifact" image information.

In the present embodiment, information relating to the "artifact", "element", "material", "base artifact", and "base artifact part" is defined in a object oriented object data format or a file format. The object data defines instance variables for indicating attributes of an object and a method for indicating processing on the object. Also, all or a part of characteristics attributed to one object data such as succession defined by object orientation can be passed on to other object data.

The object data and file are managed by being divided into several categories in accordance with their attributes, assigned tags corresponding to the categories they belong to, and structured by using Document Type Definition (DTD) of an Extensible Markup Language (XML) etc. As a result, searching becomes possible in a category defined by the DTD, interlinkage among cultural characteristic elements defined by the object data becomes clear, and assembly and change thereof, mutual operation of a method group of calculation processing such as processing of the cultural characteristic elements and instantiation of attributes become possible. Also, succession of a linkage function, reference function, etc. becomes possible for the object data.

Namely, in the present embodiment, image processing is performed by using information indicating characteristics of all or part of a consumer item or a routine thereof.

Below, in the present embodiment, an example will be described wherein information relating to the "artifact", "element", "material", "base artifact", "base artifact part", etc. is defined by using object data, but the present invention can be also applied to a case of defining them by using a file format. In the present embodiment, "main material object data" and "sub material object data" correspond to the material module data of the present invention, and "processing apparatus object data" and "processing routine object data" correspond to the element generating processing module data of the present invention.

Also, "element object data" corresponds to the element module data of the present invention, and "artifact generating processing object data" corresponds to the artifact generating processing module data of the present invention.

"Base artifact part object data" corresponds to the base artifact part module data of the present invention, and "base artifact processing object data" corresponds to the base artifact generating processing module data of the present invention.

Also, "base artifact object data" corresponds to the second artifact module data of the present invention.

"Artifact object data" corresponds to the first artifact module data of the present invention.

Flow of Overall Processing

Figure 2:
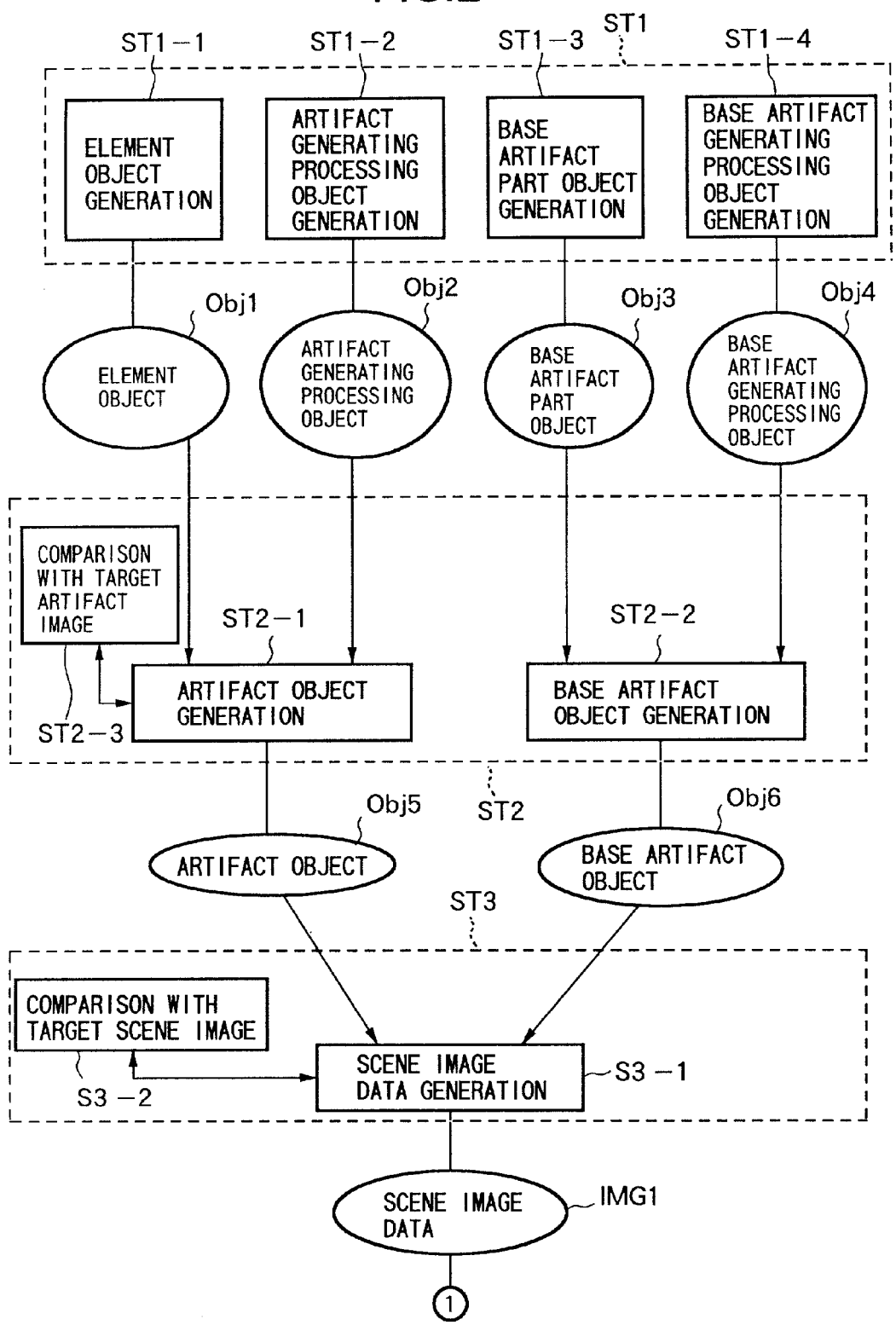
FIG. 2 is a view for explaining an overall flow of image processing of the embodiment.
Figure 3:
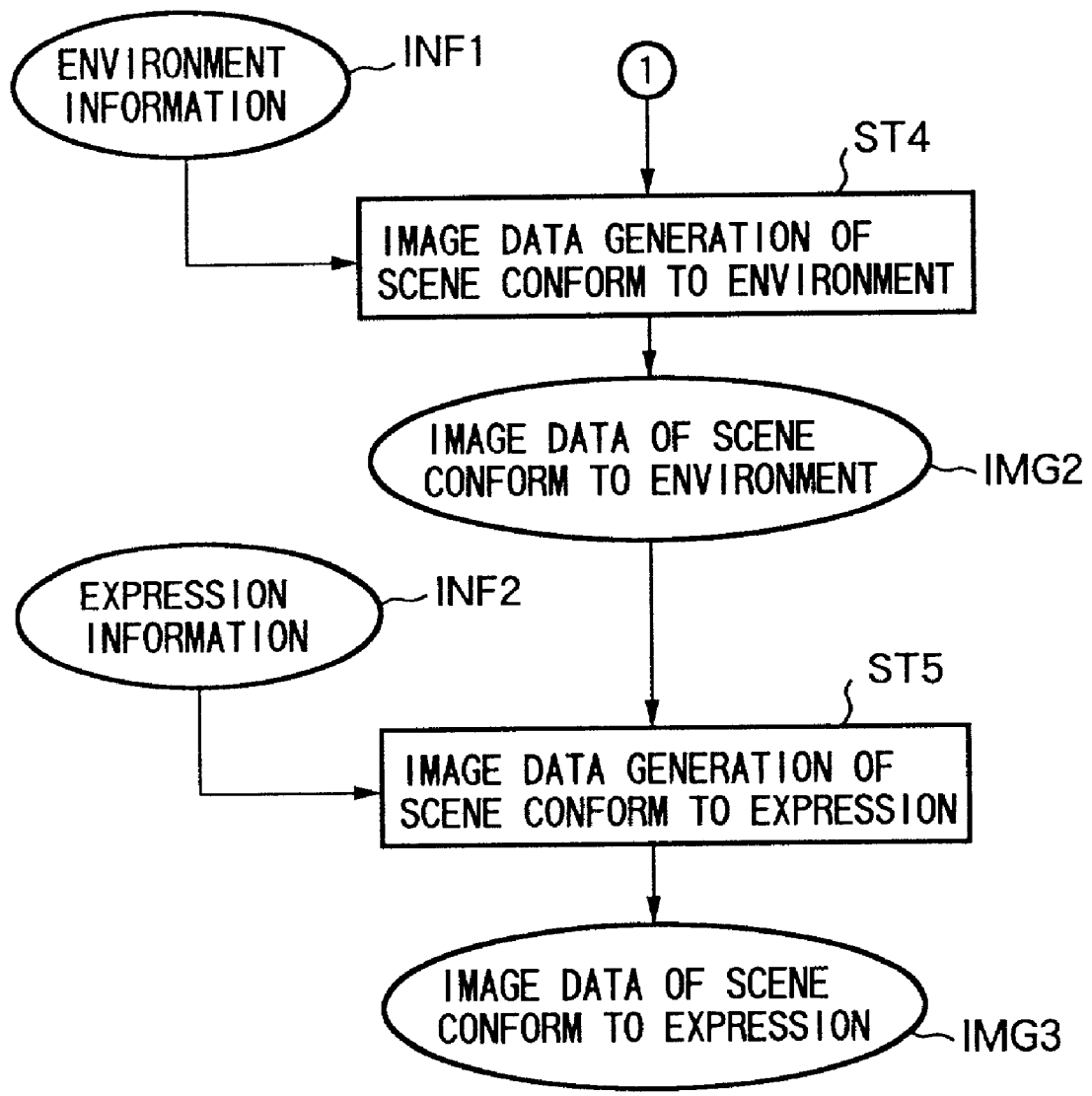
FIG. 3 is another view for explaining an overall flow of image processing of the embodiment.

FIGS. 2 and 3 are views for explaining an overall flow of the image processing.

Step ST1:

For example, in accordance with an operation of the control unit 2 by a user, the processing unit 7 performs the element object data generating processing ST1-1, artifact generating processing object data generating processing ST1-2, base artifact part object data generating processing ST1-3, and base artifact generating processing object data generating processing ST1-4 and generates the element object data Obj1, artifact generating processing object data Obj2, base artifact part object data Obj3, and base artifact generating processing object data Obj4.

The generated object data Obj1, Obj2, Obj3, and Obj4 are stored as a library in the memory unit 6 in a state enabling searching, linkage, interoperation, and succession.

The element object data Obj1 is information indicating attributes of an element. In the present embodiment, the element object data Obj1 is for example image information indicating the attributes of a fabric of fabric clothing.

The artifact generating processing data Obj2 is information indicating processing content such as a procedure of producing an artifact by using an element. In the present embodiment, for example, the artifact generating processing object data indicates a procedure of forming clothing from a fabric.

The base artifact part object data Obj3 is information indicating the attributes of a base artifact part. The base artifact part object data Obj3 also indicates information for specifying a base artifact of the base artifact part and information for specifying other base artifact parts together constituting the base artifact. In the present embodiment, the base artifact part object data Obj3 is image information indicating attributes of for example a face, hands, legs, etc. of a doll on which clothing is to be placed.

The base artifact generating processing object data Obj4 is information indicating a procedure of producing a base artifact by using base artifact parts. In the present embodiment, the base artifact generating processing object data Obj4 indicates a procedure of forming a doll by combining a head, face, hands, legs, etc. indicated by the base artifact part object data Obj3.

Step ST2:

For example, in accordance with an operation of the control unit 2 by a user, the processing unit 7 reads the specified element object data Obj1 and artifact generating processing object data Obj2 from the memory unit 6 and generates artifact object data Obj5 by using the same (Step ST2-1).

At this time, for example, it compares an image indicated by artifact object data in a generating process and a target artifact image input via the image input unit 4 and generates the artifact object data Obj5 so as to lessen the difference between these images (Step ST2-3).

The artifact object data Obj5 is stored as a library in the memory unit 6 in a state enabling searching, linkage, interoperation, and succession. At this time, the artifact object data Obj5 is assigned a tag in accordance with its attributes, structured by the XML, and stored in the memory unit 6.

In the present embodiment, at step ST2, for example, processing for forming clothing from a fabric is virtually performed in the computer 1.

Also, in accordance with an operation of the control unit 2 by a user, the processing unit 7 reads the specified base artifact part object data Obj3 and base artifact generating processing object data Obj4 from the memory unit 6 and generates the base artifact object data Obj6 using the same (Step ST2-2).

The base artifact object data Obj6 is stored as a library in the memory unit 6 in a state enabling searching, linkage, interoperation, and succession. At this time, the base artifact object data Obj6 is assigned a tag in accordance with its attributes, structured by the XML, and stored in the memory unit 6.

In the present embodiment, at step ST2, for example, processing of forming clothing from a doll from the hands and legs of a doll is virtually performed in the computer 1.

Step ST3:

For example, in accordance with an operation of the control unit 2 by a user, the processing unit 7 reads specified artifact object data Obj5 and base artifact object data Obj6 from the memory unit 6 and generates image data of a scene by using the same (Step ST3-1).

At this time, for example, it compares a scene image indicated by image data of a scene in a generating process and a target scene image input via the image input unit 4 and generates image data IMG1 of a scene so as to lessen the difference between the images (Step ST3-2).

The image data IMG1 of the scene is stored as a library in the memory unit 6 in a state enabling searching. At this time, the image data IMG1 is assigned a tag in accordance with its attributes, structured by the XML, and stored in the memory unit 6.

In the present embodiment, for example, at step ST3, the image data IMG1 of the scene of a doll with clothes on is generated in the computer 1.

Step ST4:

For example, in accordance with an operation of the control unit 2 by a user, the processing unit 7 reads image data IMG1 of a specified scene from the memory unit 6 and generates image data IMG2 of a scene conforming with the environment information by using the image data IMG1 and input environment information INF1.

The image data IMG2 of the scene is stored as a library in the memory unit 6 in a state enabling searching. At this time, the image data IMG2 is assigned a tag in accordance with its attributes, structured by the XML, and stored in the memory unit 6.

In the present embodiment, for example, image data IMG2 of a scene wherein a doll with clothes on is placed outdoors where wind blows is generated in the computer 1.

Environment information includes natural environment information, site information, space information, etc.

As the natural environment information, there are information on the thickness of the air, wind direction and strength, amount, direction, and strength of rain, color, thickness, and flow of smoke, clouds, fog, and other factors of the environment having an effect on the color, luminance, brightness, movement, and clearness of image of clothing or the base artifact and information of processing as a method of giving those effects.

The site information is for example the strength and direction of gravity. This is information which becomes a precondition at the time of processing processes of joining elements, joining clothing and the base artifact, responding to use of entity used, and adapting to the environment of use. At this time, gravity affects factors forming an element, clothing, the base artifact, subject, etc.

Also, as space information, there is for example information for defining the overall space for forming the image of a final scene and picture. For example, it is information defining a size and coordinates of a space. The elements, artifact, base artifact etc. are oriented and positioned by this information. They are lagged in category by the DTD etc. and defined in a form enabling linkage, interoperation, and succession.

Step ST5:

For example, in accordance with an operation of the control unit 2 by a user, the processing unit 7 uses the image data IMG2 of a scene conforming to the environment information obtained at step ST4 and input expression information INF2 and generates image data IMG3 of a scene conforming to the expression information.

In the present embodiment, at step ST5, for example, image data IMG3 of a scene wherein a doll with clothes on is placed outdoors where wind blows and exposed to sunlight from a predetermined direction is generated in the computer 1.

The expression information (target expression information) is for example information necessary for finally displaying a scene and includes background information, visual point information, light source information, etc.

The background information defines the angle from the visual point and perspective distance.

The visual point information defines the visual point coordinates for looking at a scene in a space.

The light source information defines the position of the sun and lighting and includes information for calculating reflection and luminance including these reflected on other objects.

Element Object Data Generating Processing ST1-1

Below, element object data generating processing ST1-1 shown in FIG. 2 will be explained.

Figure 4:
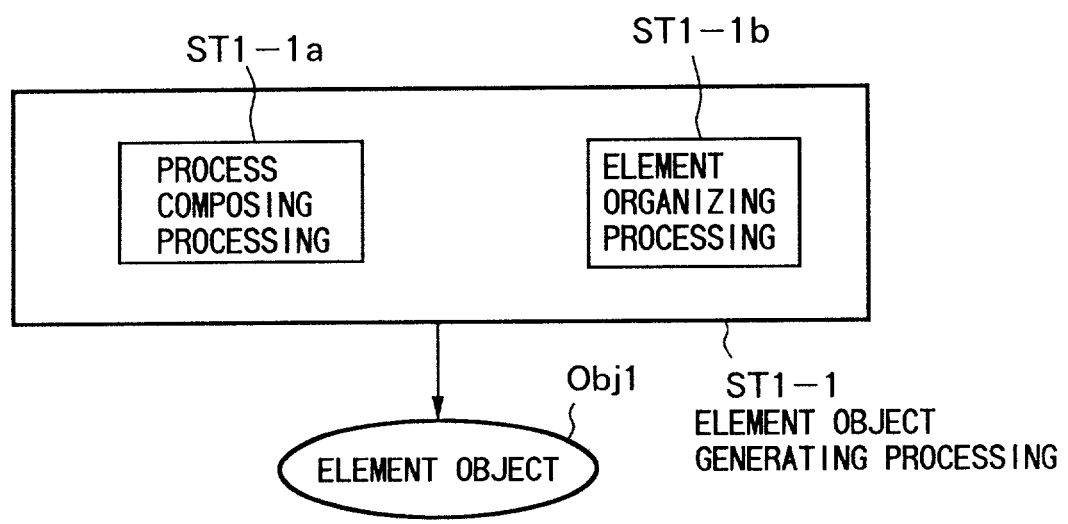
FIG. 4 is a view for explaining element object data generating processing shown in FIG. 1.

The element object data generating processing ST1-1 is, for example as shown in FIG. 4, divided into process composing processing ST1-1a and element organizing processing ST1-1b. One of the processing is selected to be performed.

[Process Composing Processing ST1-1a]

Figure 5:
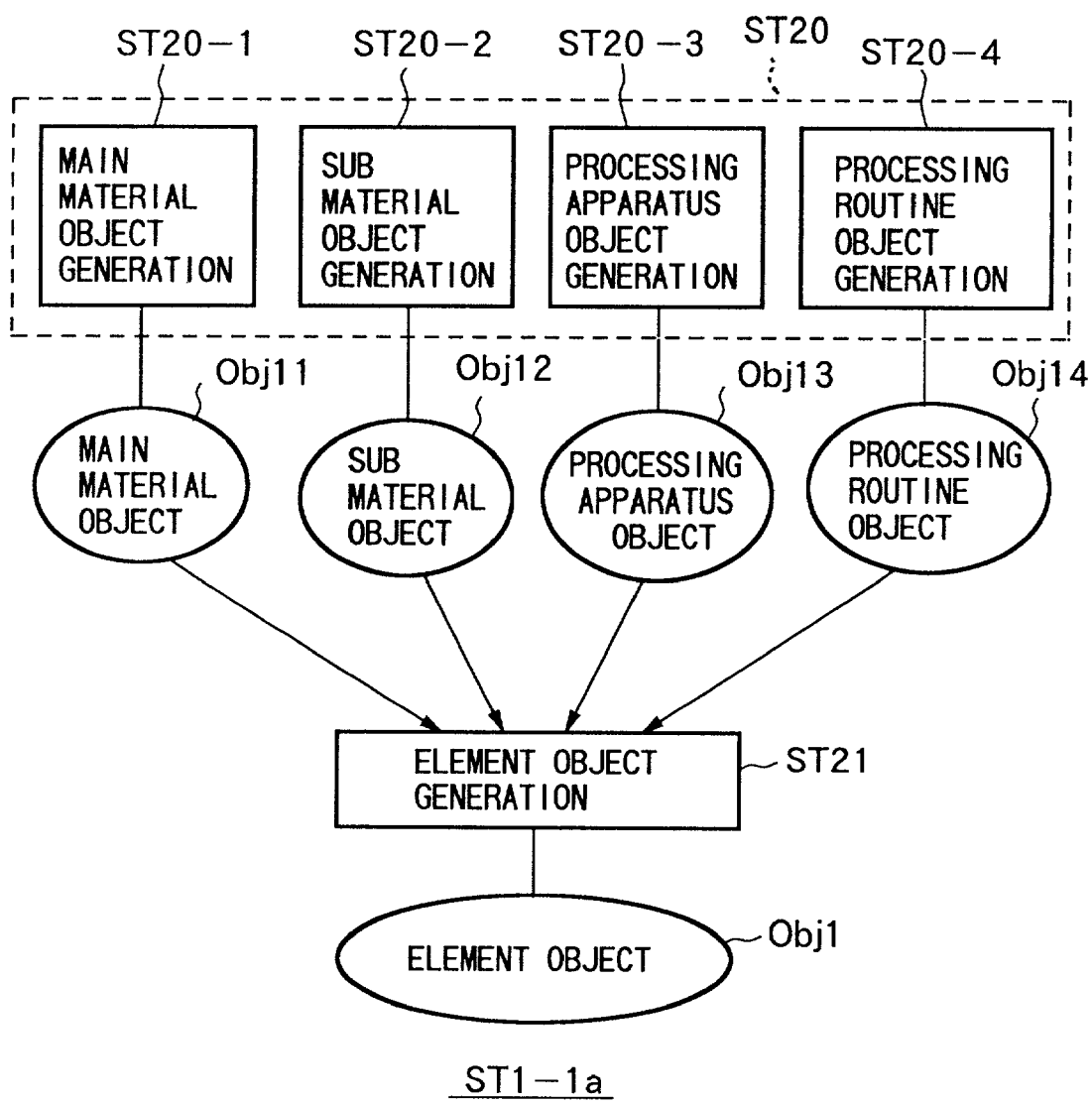
FIG. 5 is a view for explaining an overall flow of process composing processing shown in FIG. 4.

FIG. 5 is a view for explaining the flow of the process composing processing ST1-1a.

Step ST20:

For example, in accordance with an operation of the control unit 2 by a user, the processing unit 7 performs main material object data generating processing ST20-1, sub material object data generating processing ST20-2, processing apparatus object data generating processing ST20-3, and processing routine object data generating processing ST20-4 and generates main material object data Obj11, sub material object data Obj12, processing apparatus object data Obj13, and processing routine object data Obj14.

The generated object data Obj11, Obj12, Obj13, and Obj14 are stored as a library in the memory unit 6 in a state enabling searching, linkage, interoperation, and succession.

The main object data Obj11 is information indicating attributes of a material to be used as a main material at the time of producing an element. The main material is a material mounted on a space criterion apparatus at the time of producing an element by using a processing apparatus and forms the basis for determining the spatial position of a sub material.

The main material object data Obj11 has a data structure indicating for example attributes regarding physical, chemical, and color optical characteristics of the corresponding main materials.

As physical attributes, there are attributes of a cross-sectional shape, elasticity, plasticity, thermoplasticity, static and dynamic friction coefficients, specific gravity, surface roughness, viscosity (in case of a fluid) as at least attributes affecting the shape and optical characteristics relating to visualization.

As chemical attributes, there are water repellency, hydrophilicity, lipophilic property, pH, easiness of dyeing, etc.

As color optical attributes, there are kinds, chroma, brightness of colors, surface reflection degree, light absorption degree, texture, refractive index, etc.

The sub material object data Obj12 is information indicating attributes of a material subjected to processing by using the main material as a base. The sub material includes for example a material of a woof passing through a warp in weaving, a thread stitching through a fabric, etc.

The processing apparatus object data Obj13 is information indicating attributes of a processing apparatus to be used at the time of generating an element by using the main material and sub material. The attributes of the processing apparatus include attributes of a space criterion apparatus for fixing the main material in the processing apparatus in a space for assembly and processing.

The processing routine object data Obj14 is information indicating a procedure of processing by using a processing apparatus. The information indicates, for example, a procedure of how the processing apparatus generates an element by using the main material and the sub material. Also, it may includes a procedure of finishing after the processing.

Step ST21:

For example, in accordance with an operation of the control unit 2 by a user, the processing unit 7 reads specified main material object data Obj11, sub material object data Obj12, processing apparatus object data Obj13, and processing routine object data Obj14 from the memory unit 6, performs the processing performed by the processing apparatus using the read object data, main material, and sub material by following a predetermined processing routine virtually on the computer, and generates element object data Obj1 for obtaining an image in accordance therewith.

Below, a case of generating element object data Obj1 of an element of a plain weave fabric by performing process composing processing will be explained as an example.

For example, processing is simulated for selecting main material object data Obj11 of four warps #1 to #4 as main materials in accordance with an operation of the control unit 2 by a user or image data input via the image input unit 4, fixing ends of the warps to one processing apparatus, that is, the space criterion apparatus, at equal intervals in accordance with the selected processing apparatus object data Obj13 and processing routine object data Obj14, and pulling the other ends and fixing them to a another processing apparatus, that is, a fabric takeup apparatus.

Then, the sub material object data Obj12 of the sub material, that is, woofs, is selected, the color and other attributes are selected, and the woofs are made to pass over #1, under #2, over #3, and under #4 alternately.

The above processing is performed repeatedly based on the contents of the processing apparatus object data Obj13.

Note that the above processing is performed by being programmed in advance in accordance with time or by arranging a program and event in an external apparatus in advance so as to operate in a form instructed by an interactive event and inputting the same from the external apparatus.

The shape of the woofs at this time is calculated by a finite element method etc. by using tension and physical attributes of the warps (shape, modulus of elasticity, plastic properties, friction coefficient, etc.) and tension and physical characteristics of the woofs.

The thus determined three-dimensional shape of the woofs may be approximately expressed for example in a form of convolution of "$f(x:y)=a*EXP(-(x)**2b)$".

Here, the "x" is a distance in the woof direction on a y-axis (the warp direction) along a plane formed by the warps in a space defined by the apparatus for fixing the main material. The "f" is an amount of a vertical gap from the plane formed by the warps at the center of the woofs. The convolution is an addition amount having an appropriate weight of some "$f(x)$". Also, the "a" is a parameter by which the integrated "$f(x)2$" becomes 1 as a whole. The "b" is an appropriate positive integer. The warps may be expressed by the apparatus for fixing the main material and the fabric winding apparatus. The extent of sagging thereof may be calculated by gravity.

If texture is added to the warps and woofs, the visualized object can be calculated as a reflected image of light from a certain visual point.

Note that the calculation is performed again when the visual point or light source changes. As the texture on the surface, it is possible to add the actual image of yarn.

A tightness of the woofs changes in accordance with the strength of a tightening operation with a comb-shaped tool (reed) after the woofs are passed through the warps #1 to #4, a friction coefficient, plastic deforming property, etc.

The shape of the produced fabric removed from the apparatus is determined by what kind of base artifact supports the fabric. This is also calculated by a finite element method etc. from characteristic values obtained from a file of physical attributes of the fabric, gravity, etc. as to the shape of the base artifact. To change the physical attributes of an element group to physical attributes of the fabric artifact, a file is formed by obtaining data by calculation or experiments reproducing different processes of different materials.

If the warps are dyed red, blue, etc. at certain intervals, a stripe pattern appears. Also, if the same colors are used at certain intervals for the woofs, a lateral stripe pattern is formed. A checkered pattern is obtained by doing both at the same time.

Note that the attributes indicated by the object data as to the material, apparatus, operation of the apparatus, etc. used in generating the above element object data Obj1 are factors of for example specific cultural know-how of an ethnic group etc.

[Element Organizing Processing ST1-1*b*]

Figure 6:
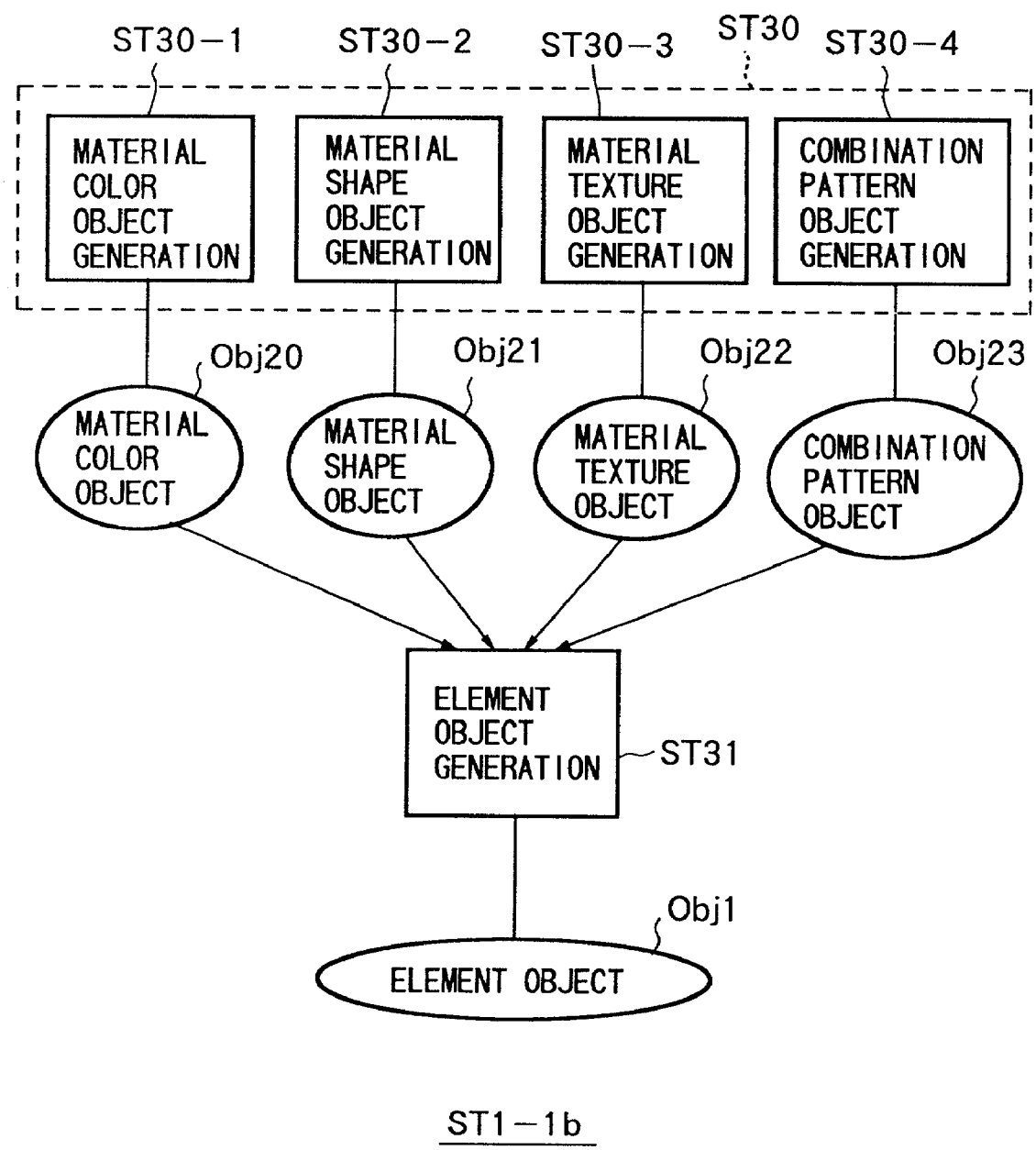
FIG. 6 is a view for explaining a flow of element organizing processing.

FIG. 6 is a view for explaining a flow of element organizing processing ST1-1*b*.

Step ST30:

For example, image data of an element is input via the image input unit 4 shown in FIG. 1, the input image data is analyzed in the processing unit 7, and color information, shape information, texture information, and combined pattern information thereof of the obtained material are generated by the analysis.

Then, material color object data Obj20 is generated by using the material color information (step ST30-1).

Material shape object data Obj21 is generated by using the material shape information (step ST30-2).

Material texture object data Obj22 is generated by using the material texture information (step ST30-3).

Also, combined pattern object data Obj23 is generated by using the combined pattern information (step ST30-4).

Then, the object data Obj20, Obj21, Obj22, and Obj23 are stored in the memory unit 6 in a state enabling searching. At this time, the object data Obj20, Obj21, Obj22, and Obj23 are assigned tags in accordance with the attributes, structured by the XML, and stored in the memory unit 6.

Step ST31:

For example, in accordance with an operation of the control unit 2 by a user, the processing unit 7 performs processing using a predetermined program to read specified combined pattern object data Obj23 from the memory unit 6, then reads material color object data Obj20, material shape object data Obj21, and material texture object data Obj22 of a combination indicated by the combined pattern object data Obj23 from the memory unit 6, and generates element object data Obj1 for obtaining an image produced by composing the data by a specified method.

As explained above, according to the present invention, the attributes of cultural factors such as "artifact", "element", "base artifact", and "base artifact part" accumulated by humanity over a long period of time and processing performed by using them are converted to object data or files by using text, graphics, etc. and stored assigned tags in accordance with the attributes, so the information can be efficiently searched through, linked, interoperated, and passed on and an image of a scene combining them can be easily generated.

Also, according to the present invention, by simulating in the computer 1 a process of actually generating an element by using a material, a process of generating an artifact by using the element, and a process of generating a scene by combining the artifact with a base artifact and reflecting the same to an image, it is possible to generate a realistic image closer to reality wherein attributes of the production process are reflected.

Note that in the present embodiment, material (element) object data for expressing a specific image of an artifact is generated in order to concretely express as an image a designed plan or idea. Therefore, "consumer and cultural heritage factors" conforming with the plan or idea are searched for from the memory unit 6 storing structurally accumulated object data, these are applied in combination or pieces on an element picture assembly workboard, and thereby a specific image is expressed as an element picture assembly. By using the element picture assembly and a system having the element picture assembly workboard for generating the same, a visualized object conforming to the plan or idea is generated.

The element picture assembly includes parts and factors which do not exist in the library, so they may be newly generated. In this case, this overlaps with the work of generating the visualized object, so parts thereof may be incorporated or replaced.

Namely, interaction between a target object and an actual object in the middle of the operation becomes easy, and an element picture assembly system having a simulator function capable of replacing the target product or producing an expression for an evaluation thereof is obtained.

The element picture assembly workboard is configured so that the above work can be performed even in a dispersed client environment.

The picture assembly and the picture assembly workboard are generated not only for the material (element), but also for the base artifact and scene.

As explained above, according to the present invention, it is possible to provide an image processing method, a program thereof, and an image processing apparatus enabling easy and efficient searches through image information of a variety of objects in accordance with the attributes of those objects and enabling an efficient image generating operation combining these and freely using realistic and natural multimedia expressions close to reality.

Also, according to the present invention, it is possible to provide an image processing method, a program thereof, and an image processing apparatus capable of providing training and assistance in the recreation of actual objects by creating a library of module data.

Note that the embodiment explained above was described to facilitate the understanding of the present invention and not to limit the present invention. Accordingly, elements disclosed in the above embodiments include all design modifications and equivalents belonging to the technical field of the present invention.

What is claimed is:

1. An image processing method for image processing by using information indicating characteristics of all or part of a consumer item and a routine thereof, comprising the steps of generating main material module data indicating an attribute of a material to be used as a main material at the time of producing an element, said main material is a material mounted on a space criterion apparatus at the time of producing an element by using a processing apparatus and forms the basis for determining the spatial position of a sub material;

generating sub material module data indicating attributes of a material subjected to processing by using the main material as a base;

generating processing apparatus module data indicating attributes of a processing apparatus to be used at the time of generating an element by using the main material module and sub material module, the attributes of the processing apparatus include attributes of a space criterion apparatus for fixing the main material in the processing apparatus in a space for apparatus and processing;

generating processing routine module data indicating a procedure of processing by the processing apparatus by using the main material and the sub material;

generating element module data indicating an attribute of said element using said main material module data, said sub material module data, said processing apparatus module data and said processing routine module data;

generating first artifact module data indicating an attribute of a first artifact using said element module data;

generating second artifact module data indicating an attribute of a second artifact to be linked with said first artifact;

storing said first artifact module data and said second artifact module data in a searchable form; and generating image data of a scene connecting said first artifact and said second artifact by using said stored first artifact module data and said second artifact module data.

2. An image processing method as set forth in claim 1, further comprising the steps of inputting image data of a target element, analyzing the input image data, and generating said element module data by using said main material module data, said sub material module data, processing apparatus module data and said processing routine module data selected based on results of the analysis.

3. An image processing method as set forth in claim 1, further comprising the steps of generating material shape module data obtained by gathering information relating to a shape of said material, material color module data obtained by gathering information regarding a color of said material, material texture module data obtained by gathering information regarding a texture of said material, and material combination module data obtained by gathering information indicating a combined pattern of the shape, color, and design of said material and generating said element module data by combining information gathered with at least one of said material shape module data, said material color module data, and said material pattern module data based on a combined pattern indicated by said material combination module data.

4. An image processing method as set forth in claim 3, further comprising the steps of inputting image data of a target element, analyzing the input image data, and generating said element module data by using said material combination module data, said material shape module data, said material color module data, and said material pattern module data selected based on results of the analysis.

5. An image processing method as set forth in claim 1, further comprising the steps of generating first artifact generating processing module data indicating an attribute of processing performed by using said element so as to obtain said first artifact and generating said first artifact module data by using said element module data and said first artifact generating processing module data.

6. An image processing method as set forth in claim 5, further comprising the steps of inputting image data of a target first artifact, analyzing the input image data, and generating said first artifact module data by using said element module data and said first artifact generating processing module data based on results of the analysis.

7. An image processing method as set forth in claim 1, further comprising the steps of generating second artifact part module data indicating an attribute of a part of said second artifact;

generating second artifact generating processing module data indicating an attribute of processing for obtaining said second artifact by combining a plurality of said parts; and generating said second artifact module data by using said second artifact part module data and said second artifact generating processing module data.

8. An image processing method as set forth in claim 7, wherein said second artifact part module data includes information indicating a relationship with another second artifact part and said first artifact.

9. An image processing method as set forth in claim 1, further comprising the steps of inputting image data of a target scene, analyzing the input image data, and generating said image data by using said first artifact module data and said second artifact module data selected based on results of the analysis.

10. An image processing method as set forth in claim 1, further comprising the steps of generating at least one of said element module data, said first artifact module data, said second artifact module data, and said scene based on information on an environment wherein said first artifact or said second artifact is used or an environment to which said scene is applied.

11. An image processing method as set forth in claim 1, further comprising the step of generating image data of said scene based on information regarding at least one of a background, visual point, and light source of said scene.

12. An image processing method as set forth in claim 1, further comprising managing at least one of said module data by defining it using an object oriented object or file, classifying it in accordance with its attributes, and adding a tag in accordance with the classification.

13. An image processing method as set forth in claim 1, wherein said module data indicates said attributes by using at least one of an image, sound, and text.

14. An image processing method as set forth in claim 1, wherein said module data is a hyper data having a hyperlink function for referring to another entity.

15. A computer program indicating a routine of image processing using information indicating characteristics of all or a part of a consumer item or its routine and executed by a computer, the computer program embodied in a computer readable medium for performing the steps of:

a routine for generating main material module data indicating an attribute of a material to be used as a main material at the time of producing an element, said main material is a material mounted on a space criterion apparatus at the time of producing an element by using a processing apparatus and forms the basis for determining the spatial position of a sub material;

a routine for generating sub material module data indicating attributes of a material subjected to processing by using the main material as a base;

a routine for generating processing apparatus module data indicating attributes of a processing apparatus to be used at the time of generating an element by using the main material module and sub material module, the attributes of the processing apparatus include attributes of a space criterion apparatus for fixing the main material in the processing apparatus in a space for assembly and processing;

a routine for generating processing routine module data indicating a procedure of processing by the processing apparatus by using the main material and the sub material;

a routine for generating element module data indicating an attribute of said element using said main material module data, said sub material module data, said processing apparatus module data and said processing routine module data;

a routine for generating first artifact module data indicating an attribute of a first artifact by using said element module data;

a routine for generating second artifact module data indicating an attribute of a second artifact to be linked with said first artifact;

a routine for storing said first artifact module data and said second artifact module data in a searchable form; and a routine for generating image data of a scene connecting said first artifact and said second artifact by using said first artifact module data and said second artifact module data.

16. An image processing apparatus for image processing using information indicating characteristics of all or part of a consumer item or its routine, said apparatus generating main material module data indicating an attribute of a material to be used as a main material at the time of producing an element, said main material is a material mounted on a space criterion apparatus at the time of producing an element by using a processing apparatus and forms the basis for determining the spatial position of a sub material;

generating sub material module data indicating attributes of a material subjected to processing by using the main material as a base;

generating processing apparatus module data indicating attributes of a processing apparatus to be used at the time of generating an element by using the main material module and sub material module, the a attributes of the processing apparatus include attributes of a space criterion apparatus for fixing the main material in the processing apparatus in a space for assembly and processing;

generating processing routine module data indicating a procedure of processing by the processing apparatus by using the main material and the sub material;

generating element module data indicating an attribute of said element using said main material module data, said sub material module data, said processing apparatus module data and said processing routine module data;

generating first artifact module data indicating an attribute of said a first artifact by using said element module data;

generating second artifact module data indicating an attribute of a second artifact to be linked with said first artifact;

storing said first artifact module data and said second artifact module data in a searchable form; and generating image data of a scene wherein said first artifact and said second artifact are linked by using said first artifact module data and said second artifact module data.

17. An image processing apparatus as set forth in claim 16, said apparatus further generating material shape module data obtained by gathering information relating to a shape of said material, material color module data obtained by gathering information regarding a color of said material, material texture module data obtained by gathering information regarding a texture of said material, and material combination module data obtained by gathering information indicating a combined pattern of the shape, color, and design of said material and generating said element module data by combining information gathered with at least one of said material shape module data, said material color module data, and said material pattern module data based on a combined pattern indicated by said material combination module data.

* * * * *

UNITED STATES PATENT AND TRADEMARK OFFICE
CERTIFICATE OF CORRECTION

PATENT NO. : 7,110,615 B2
APPLICATION NO. : 10/086630
DATED : September 19, 2006
INVENTOR(S) : Hideyasu Karasawa It is certified that error appears in the above-identified patent and that said Letters Patent is hereby corrected as shown below:

Title Page -

Item [75] Inventor, please correct the inventor's address to read as follows:

--     Hideyasu Karasawa
            c/o Data Cake Baker Corporation
            53-46, Sakuragaoka 1-chome
            Tama-shi, Tokyo 206-0013, Japan --.

Signed and Sealed this

Second Day of January, 2007

JON W. DUDAS
*Director of the United States Patent and Trademark Office*